Inventors
JANUSZ GUTKOWSKI
JOHN PARKINSON

April 4, 1961   J. GUTKOWSKI ET AL   2,978,107
HIGH PRESSURE OIL FILTER UNIT HAVING COMBINED
AUTOMATIC SHUT-OFF AND RELIEF VALVE STRUCTURE
Filed March 19, 1957   2 Sheets-Sheet 2

Inventors
JANUSZ GUTKOWSKI
JOHN PARKINSON
by: J. Richard Cavanagh

United States Patent Office 2,978,107
Patented Apr. 4, 1961

2,978,107

HIGH PRESSURE OIL FILTER UNIT HAVING COMBINED AUTOMATIC SHUT-OFF AND RELIEF VALVE STRUCTURE

Janusz Gutkowski and John Parkinson, Owen Sound, Ontario, Canada, assignors to Parmatic Engineering Limited, Owen Sound, Ontario, Canada Filed Mar. 19, 1957, Ser. No. 647,014

5 Claims. (Cl. 210—235)

This invention relates to a high pressure oil filter having a combined automatic shut-off and relief valve structure.

It is the main object of the present invention to provide an oil filter having a combined shut-off and relief valve structure on a single valve spigot member adapted to operate automatically so that the oil flow may be maintained to the outlet when the oil filter is clogged.

It is another object of the invention to provide an oil filter for aircraft lubricating and hydraulic systems from which the filter bowl may be removed without releasing fluid from the system.

It is a further object of the invention to provide an oil filter having a head part embodying a plurality of outlet fittings.

It is still a further object of the invention to provide an oil filter of simple mechanical configuration characterized by efficient oil flow with a minimum of pressure drop.

It is a still further object of the invention to provide a filter adapted for use in aircraft and the like, capable of operating with a filter element made from a large range of filter media and having a single movable pressure responsive valve spigot member, carrying plural valve structure controlling operation thereof.

Other objects of the invention will be appreciated by a study of the following specification taken in conjunction with the accompanying drawings.

Figure 1:
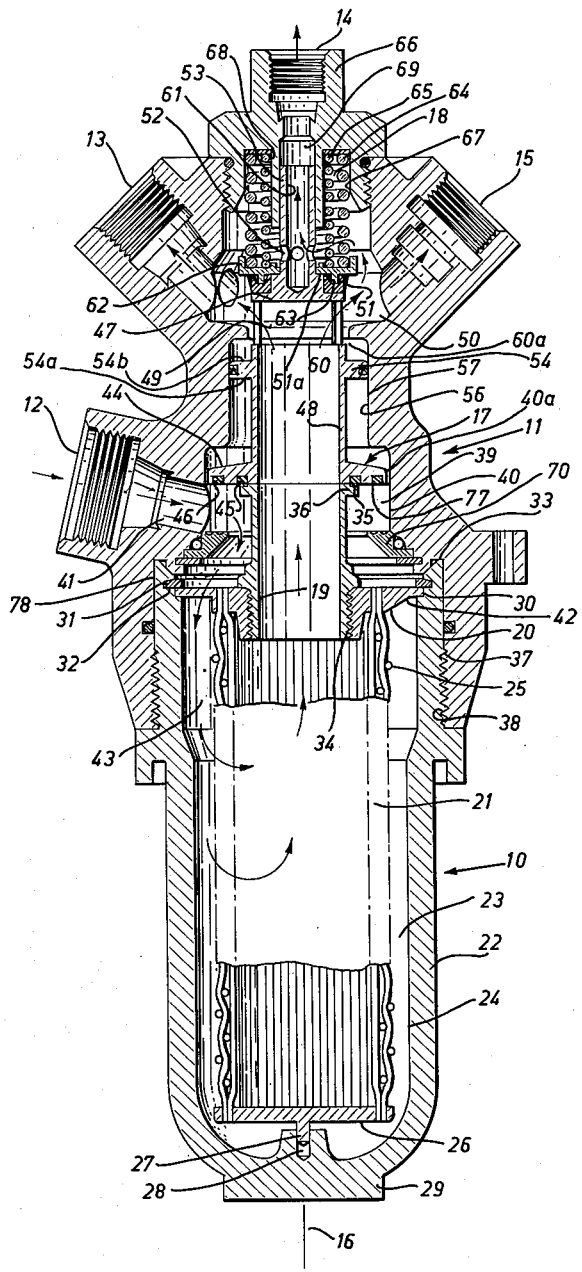
Figure 1 is a sectional view of an oil filter according to the invention and revealing the normal placement of the components for normal operation.
Figure 4:
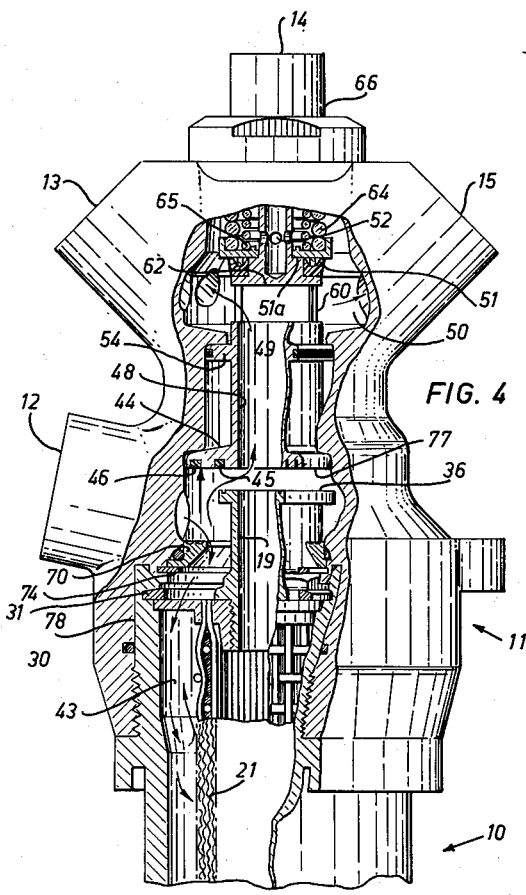
Figure 5:
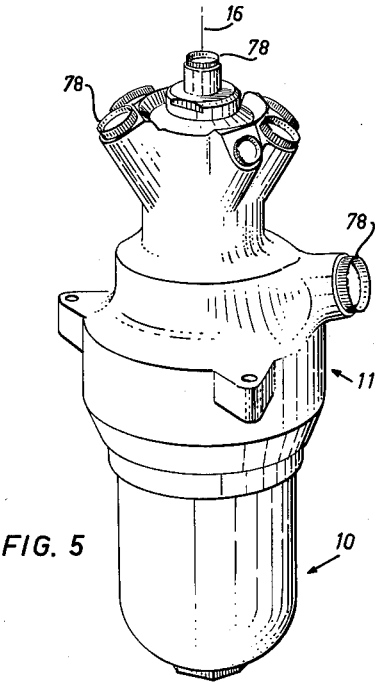

Figure 4 is a partially cut-away view of the filter unit of the invention with the lower portion of the filter bowl removed and revealing the location and operation of the valve spigot member and valve structure thereon when the filter element is clogged, preventing oil flow in the normal manner as represented in Figure 1; and Figure 5 is a perspective view of the filter unit of the invention showing closure caps threaded into the inlet and outlet fittings thereof.

Referring to the drawings and especially Figure 1, the high pressure oil filter unit of the invention generally comprises the filter bowl 10, removably mounted on the filter head 11, the head having an inlet fitting part 12 and preferably a plurality of outlet fitting parts 13, 14 and 15 diverging radially outwardly from the axis 16 of the unit or aligned therewith as shown in Figure 5. A dual valve spigot member 17 coaxial with the head 11 is adapted to be positioned between spring biasing means 18 therefor and filter outlet structure in the form of conduit post 19, extending upwardly from the spider mounting 20 for filter 21 in the filter bowl 10.

The complete assembly of the filter bowl comprises the elongated bowl casing 22 having an axial filter cavity 23 adapted to receive the filter unit 21 in spaced relation from the inner surface 24 of the walls thereof.

The filter 21 preferably comprises a filter element 25. The specific material of the filter unit is not of importance insofar as this invention is concerned for the reason that the filter unit herein is intended to employ various types of filter media. The lower end of the filter 21 is supported by a suitable disc element 26 having a protuberance 27 adapted to seat into the axial socket 28 formed in the lower hexagonal nipple 29 of the bowl casing 22. The upper end of the filter 21 is wedged into suitable apertures or otherwise secured to the mounting spider 20 which latter seats in the angular shoulder 30 of casing 22, being retained therein by the overlying split retaining ring 31, seating in the annular retaining ring socket 32 adjacent the upper lip 33 of the bowl. The mounting spider 20 is internally threaded as at 34 to threadably receive axially outwardly directed filter conduit post 19, which latter at its upper end provides a relief valve seat 35 constituted by a lateral annular projection 36 thereon. It will be observed that when the filter bowl 10 is in assembled relationship with the filter head 11, as shown in Figure 1, by virtue of co-operating thread means 37 and 38 on the head and bowl respectively, the relief valve seat 35 is disposed within the inlet chamber 39 of the head in part defined by the enlarged head bore 40 in communication with the bore 41 of inlet fitting 12.

In the position of the components shown in Figure 1, oil flow indicated by arrows proceeds by way of inlet fitting 12 and inlet chamber 39, through the filter inlet openings defined by the spaces between the radially extending arm portions 42 of spider 20 into the annular space 43 within the bowl 10, to proceed therefore through the filter 21 thence to rise through the filter outlet structure or conduit 19. The valve spigot member 17 comprises an annular flange or valve member support 44 spaced annularly for pressure communication as at 40a from surfaces of bore 40 and carrying the concentric annularly spaced apart relief valve member 45 and filter valve member 46 serving as plural valve structure. The relief valve member 45 is shown in pressure engagement with the valve seat 35 under action of biasing spring means 18, acting against the upper closed end 47 of the tubular valve spigot body 48 supporting coaxial with and of an inner diameter corresponding to the inner diameter of the filter conduit post 19. The tube 48 is vented to provide openings 49 adjacent to the closed end 47 thereof, whereby in the position of the components shown in Figure 1, oil flow may proceed through the tube 48 and vents 49 to the outlet chamber 50 in communication with the outlet fittings 13 to 15. Oil flow may also proceed above the closed end 47 having an annular shut-off valve member 51 thereon and through the spring means 18 and ports 52 of guide tube 53 to the axially aligned outlet fitting 14.

Figure 2:
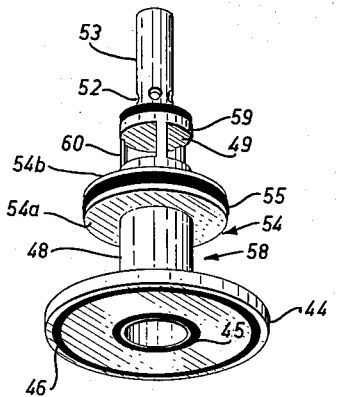
Figure 2 is an underside perspective view of a valve spigot member having plural valve member structure of the invention.

The multiple valve member structure in the form of valve spigot member 17 is shown in more detail in Figure 2. The valve spigot member is preferably fabricated from a single piece of metal turned to form the lower valve support member 44 as an outwardly directed flange portion about the lower open end thereof. A second flange portion spaced axially therefrom is formed by the annular piston member 54, adapted to carry an annular sealing strip 55 preferably of cup seal contour forming a sliding seal with the inner surfaces 56 of the secondary coaxial bore 57 extending between the inlet and outlet chambers 39 and 50 normally separated thereby as shown in Figure 1. It is to be understood that the inlet chamber pressure communicates to the lower face 54a of piston 54 past annular space 40a whereas the upper face 54b of corresponding area is normally exposed to outlet chamber pressure and in conjunction with the upper portion 56a of bore 57 effectively constitutes a portion of the outlet chamber by virtue of clearance as at 60a. The tubular valve spigot body 48 is formed by axially boring the shaft-like portion 58 to the head part 59 and venting the bored body as at 49 to leave rigid connecting members 60 connecting the head part and the tubular body 48. The head part 59 embodies the guide tube 53 having an internal bore 61 to which communication of oil may be made through the ports 52. The head part 59 carries the shut-off valve member 51, as before described, annularly disposed about the shoulder 51a supporting annular spring supporting member 62. The annular depending lip 63 of member 62 seats in the cup seal valve member 51 under action of combined spring pressure from the spring 64 of predetermined length and the spring 65 of reverse pitch. The dual spring assembly maintains operativeness upon failure of one spring. The springs are loaded to a predetermined pressure upon assembly with head 11 of the threaded fitting cap 66 having an annular spring receiving socket 67 therein, coaxial with a depending sleeve part 68 having an internal bore 69 slidably guiding and aligning the spigot guide tube 53. The fitting cap 66 incorporates a suitable threaded bore serving as a connecting fitting 14 for a connecting oil line.

As the filter bowl is unscrewed from the head 11, the filter conduit post 19 is withdrawn downwardly. The plural valve member structure of spigot 17 remains seated by its relief valve member 45 upon the relief valve seat 35 under action of the spring means 18 to follow the movement of the filter conduit post 19 downwardly until the filter valve member 46 comes into engagement with a filter valve seat 70 (Figure 3) constituted by an annular bead 71 on the annular ring-like structure 72 held within a coaxial supporting recess 73 in the head by means of a split ring retaining device 74. By this means, oil flow through the inlet chamber opening defined by the filter valve seat 70 to the filter bowl is severed. The filter bowl must be unscrewed further for complete removal and servicing. It will be observed that in the lowermost position of the valve spigot member, the shut-off valve member 51 is brought into sealing engagement with the shut-off valve surface 75 on the inwardly directed flange 76 of the head 11 effectively separating the outlet chamber 50 and bore 57. Accordingly, communication between the inlet chamber 39 and the outlet chamber is severed at the lowermost position of the valve member component shown in Figure 3.

If, during operation of the filter unit of the invention, the filter 21 for any reason should become clogged or unduly resistant to oil flow therethrough causing a total pressure in the inlet chamber such that the force developed by such pressure against the under surface 54a of piston 54, should overcome the sum of the pressure of the biasing spring means 18 and the outlet pressure against surface 54b of piston 54, then the valve spigot member 17 will be urged upwardly to the limiting position of upward motion as shown in Figure 4, at which the annular member 54 thereof comes into engagement with the inwardly directed flange 76 effectively forming a motion limiting stop within the filter head. Accordingly, the relief valve member 45 will be raised away from the relief valve seat 35, permitting oil flow which cannot pass through the filter 21 as indicated by the arrows of Figure 4 to pass over the conduit post 19 for direct communication into the inlet chamber end of the tubular valve spigot body 48 to pass through the bore and vents 49 thereof into the outlet chamber 50. By this means, oil flow may be maintained after the pressure drop through the filter has become unduly great. The change in operation is responsive to a predetermined pressure in the inlet chamber sufficient to overcome outlet chamber pressure and spring pressure and arising from increasing resistance to flow through the filter due to loading thereof by dirt and gum accumulation and the like.

Figure 3:
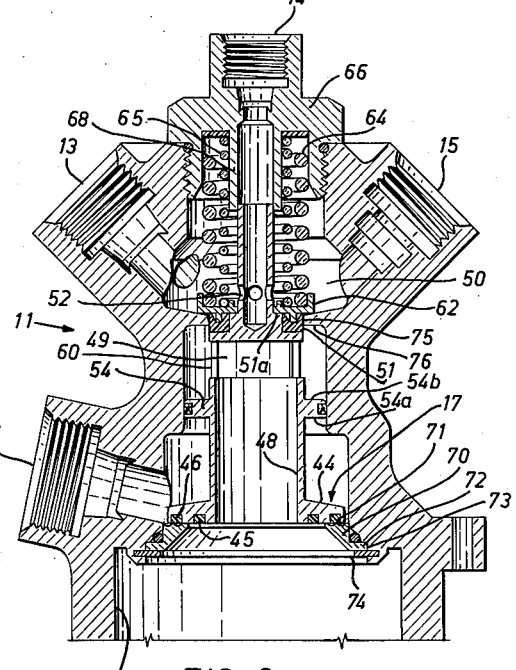
Figure 3 is a sectional view of the filter head portion of the filter unit of the invention and showing the valve spigot member in the lowermost position effecting actuation and closure of the shut-off valve part thereof when the filter bowl is removed.

It will be observed that the relief valve structure being closely associated with the shut-off and filter valve structure, provides simplicity in component organization and concept as shown in Figure 5. The head structure may be provided in a variety of designs. The outlets may be provided in different sizes. Suitable closure caps are shown fitted into the inlet and outlet fittings, to reveal that not all of the fittings need be used. As the filter bowl is removed, both the inlet and outlet chambers are sealed before the relief valve is opened. Upon reassembly of the bowl, initial thread engagement with the head is accomplished before the relief valve seat is brought into engagement with the relief valve member. Upon further threading of the bowl into the head, the filter post and its relief valve seat engages the relief valve member thereby raising the valve spigot member against spring pressure to the position shown in Figure 1, at which the bowl is fully assembled with the head. A suitable wrench is preferably applied to nipple 29 to effect final tightening of the assembly. Upon removal of the filter bowl, the relief valve member and shut-off valve member will be exposed for inspection within the filter bowl socket 78 (Figure 3). It is a particular feature of the invention that these sealing surfaces are of the direct compression type characterized by a minimum risk of damage to valve surfaces by foreign particles which do not prevent full valve closure. Thus, the relief valve member and filter valve member are of simple annular form adapted to act directly against co-operating bead-like high pressure valve seats. The force directed against the valve seat by the valve member in each case is substantially parallel to the axis 16 of the filter, all the valve being coaxially disposed. Any slight deformation occurring in the elastomer or other suitable material supplied for the valve members themselves particularly under low temperature service conditions, occurs in a manner which does not distort the valve member out of its desired line of action. Moreover, shrinkage or exposure does not affect the valve member surfaces since changes in dimensions will not affect the geometry of the inter-action of each valve member and its valve seat.

While a preferred detailed form of the invention has been disclosed to better present the inherent characteristics and concepts of the invention, it will be appreciated that the fluid filter unit of the invention generally comprises a tubular valve spigot member adapted for axial motion between inlet and outlet filter head chambers responsive to pressures in the inlet chamber acting against the biasing force of a spring. All valve structure is provided on a single valve spigot member in such manner that flow to the filter bowl is shut off by the spigot valve structure engaging co-operating valve structure in the filter bowl socket of the filter head prior to complete removal of the filter bowl from the socket. Outlet structure for the filter bowl co-operates upon engagement with the spigot valve structure to effect direct flow of outlet fluid from the filter to the outlet chamber. In the event the filter becomes clogged or unduly loaded and the pressure builds in the inlet chamber to a valve causing the force on the pressure piston of the valve spigot member to exceed spring force and outlet chamber pressure, the valve spigot member moves further upwardly to relieve the pressure and permit direct flow from the inlet chamber through the valve spigot to the outlet chamber to thus by-pass the filter. By this means, a combined shut-off and relief valve feature is achieved with a single pressure responsive valve spigot member.

While there has been described what is at present considered a preferred embodiment of the present invention, it will be appreciated by those skilled in the art that various changes and modifications can be made therein without departing from the essence of the invention and it is intended to cover herein all such changes and modifications as come within the true spirit and scope of the appended claims.

What we claim as our invention is:

1. A fluid filter unit comprising: a filter head having therein an inlet chamber and an outlet chamber spaced axially therefrom; a hollow valve spigot member axially movable within said head and adapted to communicate fluid from said inlet chamber to said outlet chamber; a filter bowl socket in said head in communication with said inlet chamber and axially aligned with said spigot member; an annular flange integral with an end of said spigot member; an annular filter shut-off valve member supported on said annular flange and adapted to sever communication between said inlet chamber and said socket upon engagement of said valve member with an annular valve seat held within the head; means biasing said spigot member for engagement of said annular filter shut-off valve member; a filter bowl mountable in said socket; projection means on said filter bowl engageable with said annular flange of said spigot member to move the latter against the force of said biasing means to effect disengagement of said annular filter shut-off valve during assembly of said bowl in said socket; an annular filter relief valve member supported concentrically with said filter shut-off valve on said annular flange; and a conduit post having an annular relief valve seat thereon and defining an outlet opening for said filter bowl and extending from the latter for engagement with said annular filter relief valve member to effect direct communication of fluid from said filter bowl through said hollow spigot member to said outlet chamber and during assembly with said head effecting motion of said spigot member causing disengagement of said filter shut-off valve member.

2. A fluid filter unit comprising: a filter head having therein an inlet chamber and an outlet chamber spaced axially therefrom; an axially movable hollow valve spigot member adapted to communicate fluid from said inlet chamber to said outlet chamber; a filter bowl socket in said head in communication with said inlet chamber and axially aligned with said spigot member; an annular flange integral with an end of said spigot member; an annular filter shut-off valve member supported on said annular flange and adapted to sever communication between said inlet chamber and said socket upon engagement thereof; means biasing said spigot member for engagement of said shut-off valve means; a filter bowl mountable in said socket; projection means on said filter bowl engageable with said spigot member to move the latter against the force of said biasing means to effect disengagement of said shut-off valve means during assembly of said bowl in said socket; conduit structure having an annular relief valve seat thereon and defining an outlet opening for said filter bowl and extending from the latter for engagement with said hollow valve spigot member to effect direct communication of fluid from said filter bowl through said hollow valve spigot member to said outlet chamber and during assembly with said head effecting motion of said spigot member causing disengagement of said filter shut-off outlet chamber valve member; and cup seal engageable with an inwardly directed flange of said head valve operative to sever communication through said hollow valve spigot member to said outlet chamber during engagement of said filter shut-off valve means.

3. A fluid filter unit comprising: a filter head having therein an inlet chamber and an outlet chamber spaced axially therefrom; an axially movable hollow valve spigot member adapted to communicate fluid from said inlet chamber to said outlet chamber; a filter bowl socket in said head in communication with said inlet chamber and axially aligned with said spigot member; an annular filter shut-off valve member in said socket; co-operating annular filter shut-off valve member on said spigot, said shut-off valve member being mutually adapted to sever communication of said inlet chamber and socket upon engagement thereof; means biasing said spigot member for engagement of said filter shut-off valve member; a filter bowl mountable in said socket; projection means on said filter bowl engageable with said spigot member to move the latter against the force of said biasing means to effect disengagement of said filter shut-off valve member during assembly of said bowl in said socket; an inlet fitting in said head in communication with said inlet chamber; and a plurality of substantially radially directed outlet fittings for said head in communication with said outlet chamber.

4. A fluid filter unit comprising: a filter head having therein an inlet chamber and an outlet chamber spaced axially therefrom; an axially movable hollow valve spigot member adapted to communicate fluid from said inlet chamber to said outlet chamber; a filter bowl socket in said head in communication with said inlet chamber and axially aligned with said spigot member; an annular flange integral with an end of said spigot member; an annular filter shut-off valve supported on said flange adapted to sever communication between said inlet chamber and said socket upon engagement of said valve member with an annular valve seat held within the head; means biasing said spigot member for engagement of said shut-off valve means; a filter bowl mountable in said socket; projection means on said filter bowl engageable with said spigot member to move the latter against the force of said biasing means to effect disengagement of said shut-off valve means during assembly of said bowl in said socket; a conduit post having an annular relief valve seat thereon and defining an outlet opening for said filter bowl and extending from the latter for engagement with said hollow valve spigot member to effect direct communication of fluid from said filter bowl to said outlet chamber and during assembly with said head effecting motion of said valve spigot member causing disengagement of said filter shut-off valve member; an inlet fitting in said head in communication with said inlet chamber; and a plurality of substantially radially directed outlet fittings for said head in communication with said outlet chamber.

5. A fluid filter unit comprising: a filter head having therein an inlet chamber and an outlet chamber spaced axially therefrom; an axially movable hollow valve spigot member adapted to communicate fluid from said inlet chamber to said outlet chamber; a filter bowl socket in said head in communication with said inlet chamber and axially aligned with said spigot member; an annular flange integral with an end of said spigot member; an annular filter shut-off valve supported on said flange adapted to sever communication between said inlet chamber and said socket upon engagement thereof; means biasing said spigot member for engagement of said shut-off valve means; a filter bowl mountable in said socket; projection means on said filter bowl engageable with said spigot member to move the latter against the force of said biasing means to effect disengagement of said shut-off valve means during assembly of said bowl in said socket; a conduit structure having an annular relief valve seat thereon and defining an outlet opening for said filter bowl and extending from the latter for engagement with said spigot member to effect direct communication of fluid from said filter bowl through said hollow valve spigot member to said outlet chamber and during assembly with said head effecting motion of said spigot member causing disengagement of said filter shut-off outlet chamber valve; valve cup seal engageable with an inwardly directed flange on said head operative to sever communication through said spigot member to said outlet chamber during engagement of said shut-off valve means; an inlet fitting in said head in communication with said inlet chamber; and a plurality of substantially radially directed outlet fittings in said head in communication with said outlet chamber.

References Cited in the file of this patent

UNITED STATES PATENTS

| | | |
|---|---|---|
| 922,657 | Worsey | May 25, 1909 |
| 2,418,777 | Le Clair | Apr. 8, 1947 |
| 2,431,782 | Walton | Dec. 2, 1947 |
| 2,439,936 | Kasten | Apr. 20, 1948 |
| 2,473,727 | Robertson | June 21, 1949 |
| 2,524,336 | Vokes | Oct. 3, 1950 |
| 2,544,244 | Vokes | Mar. 6, 1951 |
| 2,598,322 | Vokes | May 27, 1952 |

FOREIGN PATENTS

| | | |
|---|---|---|
| 163,252 | Great Britain | May 19, 1921 |